United States Patent
Naumann et al.

(10) Patent No.: US 8,134,088 B2
(45) Date of Patent: Mar. 13, 2012

(54) THREADED CABLE GLAND

(75) Inventors: Reiner Naumann, Mannheim (DE);
Gerhard Schwarz,
Schoenbrunn-Allernuehl (DE)

(73) Assignee: Cooper Crouse-Hinds GmbH, Soest (DE)

( * ) Notice: Subject to any disclaimer, the term of this patent is extended or adjusted under 35 U.S.C. 154(b) by 382 days.

(21) Appl. No.: 12/445,241

(22) PCT Filed: Aug. 30, 2007

(86) PCT No.: PCT/EP2007/007590
§ 371 (c)(1),
(2), (4) Date: Jun. 2, 2009

(87) PCT Pub. No.: WO2008/043412
PCT Pub. Date: Apr. 17, 2008

(65) Prior Publication Data
US 2010/0032204 A1 Feb. 11, 2010

(30) Foreign Application Priority Data

Oct. 11, 2006 (DE) .......................... 10 2006 048 242

(51) Int. Cl.
*H02G 3/18* (2006.01)

(52) U.S. Cl. .......... 174/653; 174/655; 439/461
(58) Field of Classification Search .......... 174/653, 174/655; 439/461; 285/314, 322, 323; 248/56
See application file for complete search history.

(56) References Cited

U.S. PATENT DOCUMENTS

| 3,055,972 | A |   | 9/1962 | Peterson |         |
| 5,621,191 | A | * | 4/1997 | Norris et al. | 174/653 |
| 5,866,853 | A | * | 2/1999 | Sheehan | 174/653 |

FOREIGN PATENT DOCUMENTS

| EP | 0515200 A1 | 11/1992 |
| EP | 1077517 A2 | 2/2001 |
| GB | 2147155 A | 5/1985 |

OTHER PUBLICATIONS

International Search Report for PCT Application No. PCT/EP2007/007590, mailed Mar. 28, 2008; 2 pages.

* cited by examiner

*Primary Examiner* — Dhirubhai R Patel
(74) *Attorney, Agent, or Firm* — Fish & Richardson P.C.

(57) ABSTRACT

A threaded cable gland includes a threaded sleeve, a stop ring arranged externally on the threaded sleeve, a retaining nut screwed onto the threaded sleeve, and a sealing element arranged within the threaded sleeve. A dwell pressure element is disposed between the retaining nut and the sealing element within the threaded sleeve, the dwell pressure element configured to act upon the sealing element.

18 Claims, 1 Drawing Sheet

THREADED CABLE GLAND

CROSS-REFERENCE TO RELATED APPLICATIONS

This application is the National Stage of International Application No. PCT/EP2007/007590, filed on Aug. 30, 2007, which claims priority to German Application No. 10 2006 048 242.5, filed on Oct. 11, 2006.

TECHNICAL FIELD

The invention relates to a threaded cable gland having at least one threaded sleeve, a stop ring arranged externally on the threaded sleeve, a retaining nut movable on the threaded sleeve, and a sealing element arranged within the threaded sleeve.

BACKROUND

Such threaded cable glands serve as protection of an electric operating material, such as a switch cabinet, a junction box, or the like, from mechanical influences, dust and moisture, wherein a cable is firmly and sealingly connected to a housing of the corresponding operating material by the threaded cable gland. The cable is lead through the threaded cable gland into the housing and the threaded cable gland can assume additional functions, such as serving, insulating, tension relief and the like.

In particular in potentially explosive areas, the corresponding housings into which such a cable is lead are flame and/or explosion protected. Thereby, certain demands are also made on the threaded cable gland. For example, the corresponding sealing of the cable within the threaded cable gland has to be flame-protected by predetermined gap sizes. For this, normally corresponding maintenance of the threaded cable gland at predetermined times is required where in particular the corresponding gap sizes within this device are checked in view of flame protection.

It moreover turned out that, depending on climatic conditions or the ageing of the cable and in particular its insulation as well as depending on the ageing of a corresponding sealing element of the threaded cable gland, the gap widths are possibly modified and flame protection is affected thereby.

SUMMARY

It is the object of the present invention to avoid, by means of a simple construction, corresponding modifications of the gap widths and thus the flame protection.

This object is achieved by the features of patent claim 1.

According to the invention, a dwell pressure element is disposed between the retaining nut and the sealing element within the threaded sleeve, the retaining nut acting on the dwell pressure element in the direction of the sealing element. This dwell pressure element serves to bring the sealing element in better contact with the cable in case the climatic conditions possibly change and thus the sealing between the cable and the sealing element of the threaded cable gland is modified, so that the corresponding gap sizes do not vary due to changing climatic conditions or the like. That means that the sealing element is essentially always additionally pressed into sealing contact by the dwell pressure element.

According to the invention it is thereby possible to increase, for example, the maintenance intervals of the threaded cable gland.

To be able to simply generate a corresponding dwell pressure force, the dwell pressure element can be a spring element, the preload of the same being adjustable by the retaining nut. Depending on the position of the retaining nut on the threaded sleeve, the preload of the spring element varies and can thus be adjusted. Thus, it might also be possible to increase the tension of the spring element and readjust it at a later point in time.

A simple example of a spring element is a helical compression spring, where several helical compression springs can also form the corresponding spring element, in particular to adapt a spring characteristic.

To be able to simply press the sealing element towards a cable or its insulation within the threaded sleeve, respectively, by action of the retaining nut and the spring element, the threaded sleeve can comprise at least one reduction in diameter in its internal bore to deflect the sealing element essentially radially inwards.

A simple possibility of realizing such a reduction in diameter can consist in the reduction in diameter being embodied as at least one deflecting inclination continuously extending in the internal bore radially inwards and diagonally away from the retaining nut to deflect a lower end of the sealing element. If the sealing element is pressed towards the reduction in diameter or the deflecting inclination by the retaining nut and the spring element, this results in a deflection radially inwards and correspondingly a contact and pressing to a cable that is lead through the threaded cable gland.

The sealing element can have various designs. To embody it with sufficient length in particular in the longitudinal direction of the threaded sleeve, it can be a sealing sleeve with an essentially constant wall thickness along its length. The constant wall thickness ensures that essentially the same force for deflecting the sealing element radially inwards has to be also applied when the sealing element. is further shifted into its longitudinal direction. Moreover, it is easier to manufacture such a sealing element.

To be able to more easily generate a contact between the dwell pressure element and the sealing element, the same can comprise a flat side at the upper and/or lower end which extends radially inwards. The dwell pressure element rests on this flat side and can press the sealing element towards the reduction in diameter or the deflecting inclination, respectively, along the total circumference. If flat sides are correspondingly embodied at both ends, one does not have to pay attention to a certain direction of installation of the sealing sleeve into the internal bore of the threaded sleeve.

To be able to firmly retain and advantageously exert a corresponding pressure on the dwell pressure element also opposite the flat side of the sealing sleeve, the retaining nut can comprise a particular surrounding retaining groove that is open towards the dwell pressure element. The dwell pressure element is inserted in this retaining groove with its end opposite the sealing sleeve or the sealing element, respectively.

A simple possibility of embodying such a retaining groove is its arrangement on a bottom side of an edge flange of the retaining nut extending radially inwards.

The edge flange can furthermore also serve to border the corresponding cable, in particular if it borders a leading-in opening for the cable at an upper end of the retaining nut.

If the threaded cable gland is at least partially inserted into a corresponding housing of an electric operating material, this installation position will be fixed by the stop ring. In this case, it is possible for the stop ring to be integral with the threaded sleeve. Thereby, the installation position of the threaded cable gland is clearly determined as the threaded sleeve can only be inserted until the stop ring externally lies against the housing of the operating material. However, to be able to possibly vary the insertion depth, the stop ring can be externally screwed onto the threaded sleeve so as to be adjustable. For this, the threaded sleeve normally comprises an external thread which can, for example, also be used to screw on the retaining nut.

If a corresponding pressure is exerted onto the dwell pressure element by the retaining nut, the same will, at least over a certain period, automatically retain the sealing element always in corresponding contact with the outer surface of the cable. However, it is possible that the readjustability of the dwell pressure element is used up after an extended period, so that no further pressing is possible. To indicate this, if required, an indication element associated to the dwell pressure element can be provided. Depending on the dwell pressure force still present in the dwell pressure element, the indication element is changed, for example its position or the like. Thereby, it can be simply determined whether on the one hand the dwell pressure element is effective and on the other hand whether it can continue to be effective.

A simple example of such an indication element can be an indication pin in contact with the dwell pressure element in a direction opposite to the dwell pressure direction.

Such an indication pin can protrude from the threaded cable gland at a corresponding site or be visible through a window, for example in the threaded sleeve, or the like. In one advantageous embodiment, the indication pin can be shiftably held in a pin boring open to the top in the area of the edge flange. Depending on the corresponding position of the indication pin within the pin boring, conclusions to the effectiveness of the dwell pressure element can be drawn.

It is possible to manufacture the indication pin separately from the dwell pressure element and for example apply a pressure force to it at one end of the dwell pressure element. If the corresponding pressure force within the dwell pressure element decreases, the action of pressure onto the indication pin is also reduced. It is also possible to form the indication pin by a free end of the helical compression spring which is bent over in particular towards the pin boring. In this manner, the indication pin is formed integrally with the helical compression spring.

To be able to press the sealing element towards the reduction in diameter or the deflecting inclination, respectively, essentially always with the same force and to thus also achieve a corresponding similar sealing between the sealing element and the cable lead through, the dwell pressure element can comprise an essentially constant spring characteristic. This means that the dwell pressure element presses, for example in the form of a helical compression spring, essentially always with the same force towards the sealing element, even if the same is further pressed towards the deflecting inclination.

The corresponding parts of the threaded cable gland can be made of different materials. They can be made, for example, of metal or plastics. Combinations of these materials are also conceivable, where the threaded sleeve, for example, is made of metal and the retaining nut is made of plastics.

It is also possible to close the corresponding leading-in opening in the retaining nut with a blind plug or the like to protect it from dust as long as no corresponding cable is lead through the threaded cable gland. Furthermore, the threaded cable gland according to the invention can comprise a bend protection, a tension relief and the like.

Below, one advantageous embodiment of the invention will be illustrated more in detail with reference to the figures enclosed in the drawing. In the drawings:

DETAILED DESCRIPTION

Figure 1:
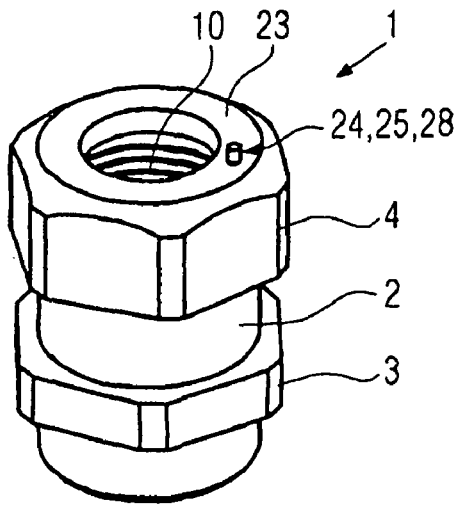
FIG. 1 shows a perspective side view of an embodiment of a threaded cable gland according to the invention.

In FIG. 1, a perspective side view of an embodiment of a threaded cable gland 1 according to the invention is represented. The threaded cable gland 1 comprises at least one threaded sleeve 2, one stop ring 3, one retaining nut 4, one sealing element 5, see FIG. 3, and one dwell pressure element 6. The threaded sleeve 2 comprises an internal bore 10 having a reduction in diameter 9 in the form of a deflecting inclination 11 approximately centrically in the longitudinal direction of the threaded sleeve 2. The deflecting inclination extends radially inwards and continuously diagonally relative to the retaining nut 4, that means in FIG. 3 diagonally downwards towards the stop ring 3.

In the represented embodiment, the stop ring 3 is integrally formed with the threaded sleeve 2. The thread formed at least in the upper part of the threaded sleeve 2 serves to screw on the retaining nut 4. The thread can also extend across the total length of the threaded sleeve 2, and in another embodiment, the stop ring 3 can be adjustably screwed onto the outside of the threaded sleeve 2 by means of this thread.

The corresponding outside diameter of the threaded sleeve 2 is essentially constant across its total length. The sealing element 5 in the form of a sealing sleeve 13 is arranged within the internal bore 10 of the threaded sleeve 2. It essentially has a constant wall thickness 14 over its total length 15. The sealing sleeve 13 is formed with flat sides 17, 18 at upper and lower ends 16, 12. One flat side is arranged in FIG. 3 at the beginning of the deflecting inclination 11 for deflection radially inwards when the retaining nut 4 exerts further pressure. The other flat side 17 serves for the contact with the dwell pressure element 6. The latter is formed as spring element 7 and in particular as helical compression spring 8. The helical compression spring 8 is inserted in a retaining groove 19 at its upper end opposite to the sealing sleeve 13. This retaining groove 19 is formed on a bottom side 20 of an edge flange 21 radially protruding inwards. The edge flange 21 borders the corresponding leading-in opening 22 at the upper end 23 of the retaining nut 4. This opening extends in continuation of the internal bore 10 and serves, together with the same, to accommodate a non-depicted cable.

It is also possible to lead more than one cable into a housing of a corresponding electric operating material by means of the threaded cable gland. Such an electric operating material is, for example; a junction box, a switch cabinet or the like. These operating materials are possibly arranged in a potentially explosive area, so that the housing as well as the corresponding threaded cable glands are embodied to be flame protected. This means that corresponding gap widths between the sealing element and the cable within the threaded cable gland do not exceed predetermined dimensions.

Figure 2:
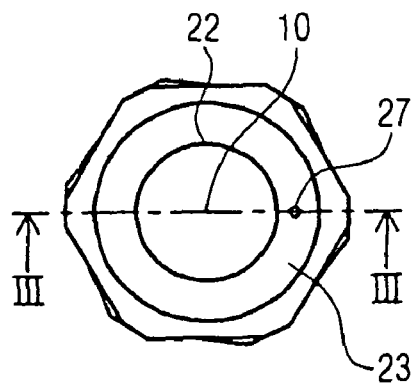
FIG. 2 shows a plan view of the threaded cable gland in accordance with FIG. 1.
Figure 3:
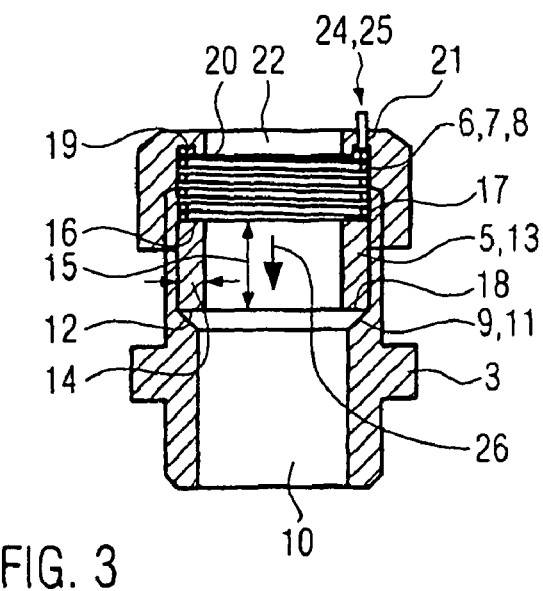
FIG. 3 shows a section along line III-III of FIG. 2.

A pin boring 27 is formed within the edge flange 21. This is, according to FIG. 2, arranged approximately centrically in the radial direction in the corresponding edge flange directly above the retaining groove 19, also see FIG. 3. FIG. 3 corresponds to a section along line III-III of FIG. 2, and FIG. 2 to a plan view of the embodiment of the threaded cable gland according to FIG. 1.

The pin boring 27 serves to accommodate an indication element 24 in the form of an indication pin 25. According to FIG. 1 and according to FIG. 3, the indication pin 25 is arranged such that it partially protrudes upwards from the pin boring 27. A lower end of the indication pin 25 is in contact with the dwell pressure element 6 or with the helical compression spring 8 forming this element, see FIG. 3.

It is also possible for the indication element 4 to be embodied as bent over free end 28 of the helical compression spring 8 which is, corresponding to FIGS. 1 and 3, inserted into the pin boring 27 from the bottom and protrudes from the same on the upper side of the edge flange 21.

Below, the functioning of the threaded cable gland according to the invention will be described briefly with reference to FIGS. 1 to 3.

Normally, first the threaded sleeve is screwed from the outside to a non-depicted housing of an operating material until it contacts the stop ring 3, the housing comprising a corresponding opening. Before or afterwards, a corresponding cable is lead into the housing of the operating material through the threaded cable gland. After corresponding arrangement of the cable within the threaded sleeve 2, corresponding pressure is applied to the sealing element 5 by screwing on the retaining nut 4 over the dwell pressure element 6. The sealing element 5 is shifted towards the deflecting inclination 11, see FIG. 3, and is deflected radially inwards by this deflecting inclination so as to be pressed to a corresponding insulation of the lead in cable. The action of pressure is in this case accomplished to such an extent that the gap widths between the sealing element 5 and the cable satisfy corresponding demands on flame protection.

If in the course of time variations in the gap width result for example due to climatic changes or the like, an automatic readjustment by means of the dwell pressure element 6 for example in the form of the helical compression spring 8 is performed. The same can in particular comprise a constant spring characteristic.

The dwell pressure into the dwell pressure direction 26 is provided until no more dwell pressure force is stored in the dwell pressure element 6. Subsequently, the indication pin 25 will protrude less or not at all from the corresponding pin boring 24, so that this indication pin 25 serves as indication element 24. By means of this indication element 24, one can determine from outside the threaded cable gland 1 whether a corresponding dwell pressure is still available or maintenance works have to be performed.

The invention claimed is:

1. A threaded cable gland comprising:
   a threaded sleeve,
   a stop ring externally arranged on the threaded sleeve,
   a retaining nut screwed on the threaded sleeve, and
   a sealing element arranged within the threaded sleeve, wherein a dwell pressure element is disposed between the retaining nut and the sealing element within the threaded sleeve, the dwell pressure element configured to act upon the sealing element.

2. The threaded cable gland according to claim 1, wherein the dwell pressure element is a spring element, and wherein, a preload of the spring element is configured to be adjusted by the retaining nut.

3. The threaded cable gland according to claim 2, wherein the spring element comprises at least one helical compression spring.

4. The threaded cable gland according to claim 1, wherein the threaded sleeve comprises at least one reduction in diameter in its internal bore to deflect the sealing element radially inwards.

5. The threaded cable gland according to claim 4, wherein the reduction in diameter is embodied as deflecting inclination extending continuously radially inwards and diagonally away from the retaining nut to deflect a lower end of the sealing element.

6. The threaded cable gland according to claim 1, wherein the sealing element is a sealing sleeve with an essentially constant wall thickness along its length.

7. The threaded cable gland according to claim 6, wherein the sealing sleeve comprises a flat side radially extending inwards at the upper or lower end.

8. The threaded cable gland according to claim 1, wherein the retaining nut comprises a surrounding retaining grove that is open towards the dwell pressure element.

9. The threaded cable gland according to claim 8, wherein the retaining groove is formed on a bottom side of an edge flange of the retaining nut extending radially inwards.

10. The threaded cable gland according to claim 9, wherein the edge flange borders a leading-in opening at an upper end of the retaining nut.

11. The threaded cable gland according to claim 1, wherein the stop ring is integrally formed with the threaded sleeve.

12. The threaded cable gland according to claim 1, wherein the stop ring is externally screwed onto the threaded sleeve so as to be adjustable.

13. The threaded cable gland according to claim 1, wherein an indication element is associated to the dwell pressure element.

14. The threaded cable gland according to claim 13, wherein the indication element comprises an indication pin being in contact with the dwell pressure element in a direction opposite to the dwell pressure direction.

15. The threaded cable gland according to claim 14, wherein the indication pin is shiftably held in a pin boring open to a top proximate an edge flange of the retaining nut.

16. The threaded cable gland according to claim 14, wherein the indication pin is formed by a free end of a helical compression spring that is bent over towards the pin boring.

17. The threaded cable gland according to claim 14, wherein the indication pin is separate from the dwell pressure element and the dwell pressure element exerts a pressure on the indication pin.

18. The threaded cable gland according to claim 1, wherein the dwell pressure element comprises an essentially constant spring characteristic.

* * * * *

UNITED STATES PATENT AND TRADEMARK OFFICE
CERTIFICATE OF CORRECTION

PATENT NO. : 8,134,088 B2
APPLICATION NO. : 12/445241
DATED : March 13, 2012
INVENTOR(S) : Reiner Naumann and Gerhard Schwarz It is certified that error appears in the above-identified patent and that said Letters Patent is hereby corrected as shown below:

On the Title Page, Item (75) Inventors in line 3, replace "Schoenbrunn-Allernuehl" with --Schoenbrunn-Allemuehl--.

Signed and Sealed this
Twenty-sixth Day of June, 2012

David J. Kappos
*Director of the United States Patent and Trademark Office*